(12) United States Patent
Kim (10) Patent No.: US 10,868,322 B2
(45) Date of Patent: Dec. 15, 2020

(54) HYDROCARBON-BASED CROSS-LINKED MEMBRANE IN WHICH NANOPARTICLES ARE USED, METHOD FOR MANUFACTURING SAID MEMBRANE, AND FUEL CELL

(71) Applicant: NATIONAL INSTITUTE FOR MATERIALS SCIENCE, Tsukuba (JP)

(72) Inventor: Jedeok Kim, Tsukuba (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 130 days.

(21) Appl. No.: 16/318,319

(22) PCT Filed: Jul. 10, 2017

(86) PCT No.: PCT/JP2017/025126
§ 371 (c)(1),
(2) Date: Jan. 16, 2019

(87) PCT Pub. No.: WO2018/016367
PCT Pub. Date: Jan. 25, 2018

(65) Prior Publication Data
US 2019/0288319 A1    Sep. 19, 2019

(30) Foreign Application Priority Data
Jul. 20, 2016 (JP) .................... 2016-142277

(51) Int. Cl.
*H01M 8/1027* (2016.01)
*C08G 75/20* (2016.01)
(Continued)

(52) U.S. Cl.
CPC .......... *H01M 8/1027* (2013.01); *C08G 75/20* (2013.01); *C08G 77/392* (2013.01); *H01B 1/06* (2013.01);
(Continued)

(58) Field of Classification Search
CPC ........ H01M 8/1027; H01M 8/02; H01M 8/10; H01M 8/1032
See application file for complete search history.

(56) References Cited

U.S. PATENT DOCUMENTS

2005/0031925 A1    2/2005  Ofer et al.
2006/0199059 A1*   9/2006  Xu .................. H01M 8/103
                                                429/483
(Continued)

FOREIGN PATENT DOCUMENTS

| JP | 2001247741 A | 9/2001 |
| JP | 2006070246 A | 3/2006 |
| KR | 100800313 B1 | 2/2008 |

OTHER PUBLICATIONS

Wang et al., "A review of polymer electrolyte membrane fuel cells: technology, applications, and needs on fundamental research" Applied Energy, vol. 88 (2011), pp. 981-1007, dated Jan. 1, 2011.
(Continued)

*Primary Examiner* — Jimmy Vo
(74) *Attorney, Agent, or Firm* — Brinks Gilson & Lione (57) ABSTRACT

A hydrocarbon-based cross-linked membrane used for the proton exchange membrane of a fuel cell, containing a cross-linked composite mediated by the sulfonate groups of SPPSU and SPOSS. Where SPPSU is represented by formula (I), where a, b, c, and d are each independently an integer of 0-4, and the total of a, b, c, and d is a rational number greater than 1 in terms of the average per repeating unit, and SPOSS is represented by formula (II), where each R is independently a hydrogen, a hydroxyl group, a straight or branched C1-20 alkyl or alkoxyl group optionally containing a substituent, or any of the above-mentioned structures, each e is independently an integer of 0-2 for R, x is an
(Continued)

(a)

(b)

(c)

integer of 1-20, and the total number of sulfonate groups is a rational number greater than 2 in terms of the average per molecule.

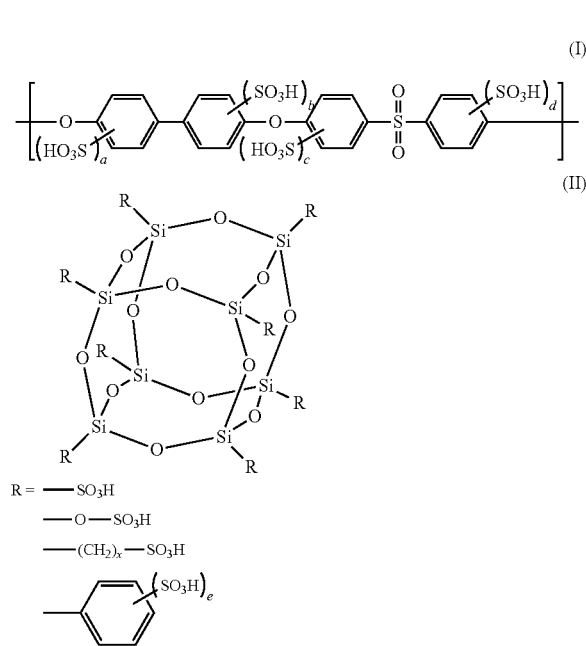

10 Claims, 3 Drawing Sheets (51) Int. Cl.
    C08G 77/392    (2006.01)
    H01M 8/1032   (2016.01)
    H01M 8/10     (2016.01)
    H01B 1/06     (2006.01)
    H01B 13/00    (2006.01)
    H01M 8/02     (2016.01)
    H01M 8/1018   (2016.01)

(52) U.S. Cl.
    CPC ............. *H01B 13/00* (2013.01); *H01M 8/02* (2013.01); *H01M 8/10* (2013.01); *H01M 8/1032* (2013.01); *H01M 2008/1095* (2013.01); *H01M 2300/0082* (2013.01); *Y02P 70/50* (2015.11)

(56) References Cited

U.S. PATENT DOCUMENTS

2010/0104918 A1   4/2010   Nowak et al.
2011/0223404 A1   9/2011   Wu et al.

OTHER PUBLICATIONS

Chandan et al., "High Tempertature (HT) polymer electrolyte membrane fuel cells (PEMFC)—A review" J of Power Sources, vol. 231 (2013) pp. 264-278, date available online Jan. 28, 2013.
Zaidi, Chapter 2, Research Trends in Polymer Electrolyte Membranes for PEMFC, Polymer Membranes for Fuel Cells, 20 pages, 2009.
Di Vona et al., "High performance sulfonated aromatic ionomers by solvothermal macromelecular synthesis", Int'l J of Hydrogen Energy, vol. 37 (2012), pp. 8672-8680, date available online Mar. 24, 2012.
Kim et al., "Crosslinked SPES-SPPSU membranes for high temperature PEMFCs", Int'l J of Hydrogen Energy, vol. 38 (2013), pp. 1517-1523, date available online Nov. 17, 2012.
Zhang et al., "High Temperature Polymer Electrolyte Membranes Based on Poly (2,5-benzimidazole) (ABPBI) and POSS Incorporated Ionic Liquid", J of Materials and Chemical Engineering, Oct. 2014, vol. 2, No. 4, pp. 86-93.
Decker et al., "Multilayer Sulfonated Polyhedral Oligosilsesquioxane (S-POSS)-Sulfonated Polyphenylsulfane (S-PPSU) Composite Proton Exchange Membranes" Chem. Mater. (2010), vol. 22, pp. 942-948, date published online Oct. 29, 2009.
Hartmann-Thompson et al., "Proton-Conducting Polyhedral Oligosilsesquioxane Nanoadditives for Sulfonated Polyphenylsulfone Hydrogen Fuel Cell Proton Exchange Membranes", J of Applied Polymer Science, vol. 110, (2008), pp. 958-974.
Je-Deok Kim, ANM2016 English Abstract, "Improvement of the stability using highly sulfonated polyphenylsulfone membrane" dated Jul. 26, 2016, 3 pages.
International Search Report in Application No. PCT/JP2017/025126, dated Aug. 29, 2017, 2 pages.
Extended European Search Report for Europe Application No. 17830887.0, dated Jan. 29, 2020, 8 pages.
M.L. Di Vona et al., "High ionic exchange capacity polyphenylsulfone (SPPSU) and polyethersulphone (SPES) cross-linked by annealing treatment: Thermal stability, hydration level and mechanical properties", J of Membrane Science, vol. 354, No. 1-2, dated May 1, 2010, pp. 134-141, XP055518590, 8 pages.
International Preliminary Report on Patentability for International Application No. PCT/JP2017/025126, dated Jan. 31, 2019, 11 pages.

* cited by examiner

HYDROCARBON-BASED CROSS-LINKED MEMBRANE IN WHICH NANOPARTICLES ARE USED, METHOD FOR MANUFACTURING SAID MEMBRANE, AND FUEL CELL

This application is a 371 application of PCT/JP2017/025126 having an international filing date of Jul. 10, 2017, which claims priority to JP2016-142277 filed Jul. 20, 2016, the entire content of each of which is incorporated herein by reference.

TECHNICAL FIELD

The present invention relates to a hydrocarbon-based cross-linked membrane including nanoparticles, and a method for making the same. More specifically, the present invention relates to a cross-linked composite membrane of a sulfonated polyphenyl sulfone (SPPSU) and a sulfonated polyhedral oligomeric silsesquioxane (SPOSS) in the form of nanoparticles, a method for making the same, and a fuel cell.

BACKGROUND ART

Proton exchange membrane fuel cell (PEMFC) (also referred to as solid polymeric fuel cell) is one of most promising electrochemistry devices for clean and effective electric power generation. PEMFC is an energy device which converts chemical energy to electrical energy using a proton-conductive polyelectrolyte membrane. The performance of PEMFC is strongly influenced by electrodes, proton exchange membranes, and their assemblies.

Typical proton exchange membranes of PEMFC include fluorine-based polymers and hydrocarbon-based polymers, and the former ones are more close to commercialization. Examples of commonly used fluorine-based polymers include perfluorinated copolymers such as Nafion (registered trademark of E.I. du Pont de Nemours and Co.). Nafion is a perfluorosulfonic acid material composed of a hydrophobic perfluorocarbon backbone and a perfluoro side chain having a sulfonic acid group. These fluorine-based polymers have high stability to hydrolysis and oxidation, and excellent proton conductivity.

However, fluorine-based polymers have three major disadvantages: very high price, loss of conductivity at relatively high temperatures and low humidity, and high methanol permeability. On the other hand, with the aim of improvement of efficiency of fuel cell systems, recent study has been directed to the development of a polymer electrolyte fuel cell for operation at low humidity or high temperatures which indicates high proton conductivity and requires no humidifier or radiator (see Non-Patent Literature 1). However, it is difficult to provide a fuel cell which can solve these problems using fluorine-based polymers having the above-described disadvantages, which hinders the application of the fuel cells. More specifically, when the above-described perfluorosulfonic acid is included in a proton exchange membrane of PEMFC, protons of the sulfonic acid groups are hard to be dissociated in an environment at high temperatures and no (low) humidification, which causes a disadvantage of decrease in proton conductivity (see Non-Patent Literatures 2 and 3). Therefore, research and development of alternative membranes made of hydrocarbon-based polymers (engineering plastic polymers) have been promoted. Several aromatic polymer ionomer membranes such as sulfonated polyimide, sulfonated polyether sulfone (SPES), polybenzimidazole (PBI), modified PBI monomer, sulfonated polyether ether ketone (SPEEK), and sulfonated polyphenyl sulfone (SPPSU) have been intensively studied.

In order to obtain a polyelectrolyte membrane which allows high proton conduction in a low humidity environment, intensive research for increasing the concentration of sulfonic acid groups has been forwarded. The reason for this is that the higher concentration of sulfonic acid groups per unit density can increase the degree of dissociation of water, and the shortening of the distance between sulfonic acid can facilitate proton hopping (or proton conduction) (see Non-Patent Literatures 2 and 3). However, the higher concentration of sulfonic acid group can increase the proportion of hydrophilic sulfonic acid groups to the hydrophobic polymer backbone, whereby the polymer electrolyte can have a higher water uptake and lead to easier dissolution or swelling, which shall impair stability of the electrolyte (or mechanical strength of the membrane) (see Non-Patent Literatures 2 and 3).

Among various hydrocarbon-based polymers, in particular, sulfonated polyphenyl sulfone (SPPSU) is low cost and has excellent thermal stability and high chemical resistance. Because this material has as high water solubility as other hydrocarbon-based polymers having sulfonic acid groups, it is commonly considered that the average number of sulfonic acid groups per repeating unit (hereinafter referred to as "degree of sulfonation") is required to be 1 or less for stabilizing the polymer electrolyte (i.e. for keeping mechanical strength of the electrolyte membrane). With relation to this, Non-Patent Literatures 4 and 5 report that electrolyte membranes were obtained by controlling the degree of sulfonation of SPPSU in the range of 1 or more, and subjecting the SPPSU to a heat treatment. However, because sufficient stabilization (mechanical strength) was not achieved by these electrolyte membranes, satisfaction of all of further stabilization, excellent proton conductivity, and stability at a high level have been demanded.

On the other hand, polyhedral oligomeric silsesquioxane (POSS) is known as inorganic nanoparticles having a cage structure containing silicon (Si)-oxygen (O) bonds (see Non-Patent Literatures 6, 7, and 8). This is also referred to as "cage-like oligomeric silsesquioxane".

Because POSS is in the form of particles (nanoparticles) of several nanometers, and has a smaller size than common inorganic particles of several tens to several hundreds nanometers, POSS is expected not to hinder the movement of protons even in a proton-conductive polymer membrane. Additionally, POSS allows bonding of up to eight functional groups at the terminals of its cage structure, and thus allows the introduction of more sulfonic acid groups per unit molecule when compared with inorganic particles. Therefore, a composite membrane of a sulfonated POSS (SPOSS) and a hydrocarbon-based Polymer likely increases the degree of proton dissociation, and thus improves electric conductivity.

Non-Patent Literatures 7 and 8 report production examples of SPOSS-SPPSU mixed system electrolyte membranes.

In these prior art literatures, intended is to improve proton conductivity; the degree of sulfonation of SPPSU is 1 or less, and the addition amount of SPOSS is 10% by mass or more, ideally 20%. In these prior art literatures, there is no disclosure of cross-linking or heat treatment of the above-described mixed systems, and sufficient stability (mechanical strength) may not be achieved by these electrolyte membranes.

CITATION LIST

Non-Patent Literature

Non-Patent Literature 1: Y. Wang, K. Chen, et al, Applied Energy, 88, 981-1007 (2011)
Non-Patent Literature 2: A. Chandan, et al, J. Power Sources, 231, 264-278 (2013)
Non-Patent Literature 3: S. M. Javaid Zaidi, "Research Trends in Polymer Electrolyte Membranes for PEMFC (Ch. 2)," Polymer Membranes for fuel Cells, Springer Science+Business Media (2009)
Non-Patent Literature 4: M. L. Di Vona, et al, Int. J. Hydrogen Energy, 37, 8672-8680 (2012)
Non-Patent Literature 5: J. D. Kim, et al, Inter. J. Hydrogen Energy, 38 (3), 1517-1523 (2011)
Non-Patent Literature 6: F. Zhang, et al, J. Mater. & Chem. Eng., 2 (4), 86-93 (2014)
Non-Patent Literature 7: B. Decker, et al, Chem. Mater., 22, 942-948 (2010)
Non-Patent Literature 8: C. Hartmann-Tompson, J. Applied Polymer Science, 110, 958-974 (2008)

SUMMARY OF INVENTION

Technical Problem

In view of the above-described disadvantages of prior art, regarding hydrocarbon-based polymers used in proton exchange membranes of proton exchange membrane fuel cells, desired is the development of a novel polymeric cross-linked membrane having stability to water (or retained mechanical strength) while keeping high concentration of sulfonic acid groups (or keeping high proton conductivity).

Solution to Problem

As a result of dedicated research, the inventors have found that cross-linking of SPPSU and SPOSS under heating to form a composite increases the amount of sulfonic acid groups per unit density to increase proton conductivity, and provides a hydrocarbon-based cross-linked membrane having lowered solubility and improved stability, thus accomplishing the present invention.

Accordingly, the solution for solving the above-described problems in the present invention is as described below.

[1].
A hydrocarbon-based cross-linked membrane used in a proton exchange membrane of a proton exchange membrane fuel cell, the hydrocarbon-based cross-linked membrane comprising a cross-linked composite of a sulfonated polyphenyl sulfone (SPPSU) and a sulfonated polyhedral oligomeric silsesquioxane (SPOSS) via sulfonic acid groups.

[2].
The hydrocarbon-based cross-linked membrane according to item [1], wherein the cross-linked composite is a cross-linked composite of: an SPPSU having a structure represented by the formula (I):

(wherein a, b, c, and d are each independently an integer of 0 to 4, the total of a, b, c, and d is a rational number greater than 1 on average per repeating unit), and an SPOSS having a structure represented by the formula (II):

(wherein R is each independently hydrogen, a hydroxyl group, a straight or branched alkyl group or alkoxyl group with a carbon number of 1 to 20 which may have a substituent, or any of the above-described structures; e is (if present) an integer of 0 to 2 for each independent R; x is (if present) an integer of 1 to 20, and the total number of sulfonic acid groups is a rational number greater than 2 on average per molecule).

[3].
The hydrocarbon-based cross-linked membrane according to item [2], wherein the total of a, b, c, and d is 2 or more on average per repeating unit, and/or the total of e is 8 or 16 on average per molecule.

[4].
The hydrocarbon-based cross-linked membrane according to any one of items [1] to [3], wherein the mass proportion of the SPOSS to the SPPSU in the cross-linked composite is 10% by mass or less.

[5].
A proton exchange membrane fuel cell comprising the hydrocarbon-based cross-linked membrane according to any one of items [1] to [4] as a proton exchange membrane.

[6].
A method for producing a hydrocarbon-based cross-linked membrane used in a proton exchange membrane of a proton exchange membrane fuel cell, comprising a step of forming a cross-linked composite by subjecting a sulfonated polyphenyl sulfone (SPPSU) and a sulfonated polyhedral oligomeric silsesquioxane (SPOSS) to a cross-linking reaction via sulfonic acid groups under heating.

[7].

The method for producing a hydrocarbon-based cross-linked membrane according to item [6], wherein the step of forming a cross-linked composite comprises subjecting an SPPSU represented by the formula (I):

(wherein a, b, c, and d are each independently an integer of 0 to 4, the total of a, b, c, and d is a rational number greater than 1 on average per repeating unit), and an SPOSS represented by the formula (II):

(wherein R is each independently hydrogen, a hydroxyl group, a straight or branched alkyl group or alkoxyl group with a carbon number of 1 to 20 which may have a substituent, or any of the above-described structures, e is (if present) an integer of 0 to 2 for each independent R, x is (if present) an integer of 1 to 20, and the total number of sulfonic acid groups is a rational number greater than 2 on average per molecule) to a cross-linking reaction via sulfonic acid groups.

[8].
The method for producing a hydrocarbon-based cross-linked membrane according to item [7], wherein the total of a, b, c, and d is 2 or more on average per repeating unit, and/or the total of e is 8 or 16 on average per molecule.

[9].
The method for producing a hydrocarbon-based cross-linked membrane according to any one of items [6] to [8], wherein the mass proportion of the SPOSS to the SPPSU in the cross-linked composite is 10% by mass or less.

[10].
The method for producing a hydrocarbon-based cross-linked membrane according to any one of items [6] to [9], wherein the step of forming a cross-linked composite is followed by a step of heat-treating the thus obtained cross-linked composite in sulfuric acid.

Advantageous Effects of Invention

According to the present invention, a hydrocarbon-based cross-linked membrane having stability to water while keeping high concentration of sulfonic acid groups can be obtained. More specifically, the present invention can provide a hydrocarbon-based cross-linked membrane including a cross-linked composite of an SPPSU and an SPOSS via sulfonic acid groups, the membrane keeping mechanical strength while keeping high proton conductivity. Also, the present invention can provide a proton exchange membrane fuel cell including the cross-linked membrane in a proton exchange membrane.

DESCRIPTION OF EMBODIMENTS

The hydrocarbon-based cross-linked membrane used in a proton exchange membrane of a proton exchange membrane fuel cell according to the present invention is characterized by including a cross-linked composite of a sulfonated polyphenyl sulfone (SPPSU) and a sulfonated polyhedral oligomeric silsesquioxane (SPOSS) via sulfonic acid groups.

In this cross-linked composite, plural molecular chains of the SPPSU are firmly cross-linked with the SPOSS having sulfonic acid groups, whereby a proton exchange membrane having good balance between high concentration of sulfonic acid groups and stability to water, more specifically, having great balance between proton conductivity and mechanical strength can be obtained.

The sulfonated polyphenyl sulfone (SPPSU) is not particularly limited as to the position and degree of sulfonation and degree of polymerization, but typically has the structure represented by the above-described formula (I).

In the formula, a, b, c, and d are each independently an integer of 0 to 4, the total of a, b, c, and d is a rational number greater than 1 on average per repeating unit.

From a viewpoint of good balance between high concentration of sulfonic acid groups (proton conductivity) and stability to water (mechanical strength), a and/or b and/or c and/or d is preferably 1, the total of a, b, c, and d is 1.5 or more on average per repeating unit. More preferably, the total of a, b, c, and d is about 2 or more on average per repeating unit. The total of a, b, c, and d is typically about 2 or about 4. Most typically, the total of a, b, c, and d is about 2.

In the formula, n (the number of repeating units) is not particularly limited, and may be a value which can make the weight average molecular weight MW of the SPPSU (weight average molecular weight in terms of polystyrene as measured by gel-permeation chromatography; hereinafter the same) fall within the range of 5,000 to 500,000, preferably within the range of 10,000 to 300,000. In alternative embodiment, the n in the formula is not particularly limited, and may be a value which can make the weight average molecular weight MW of the SPPSU fall within the range of 5,000 to 200,000, 10,000 to 100,000, or 5,000 to 100,000, or 10,000 to 200,000.

The method for synthesizing the sulfonated polyphenyl sulfone (SPPSU) is not particularly limited, for example, may be any known method such as the method disclosed in Examples of JP-A-2015-170583 (National Institute for Materials Science).

The sulfonated polyhedral oligomeric silsesquioxane (SPOSS) is not particularly limited as to the location and degree of sulfonation, but typically has a structure represented by the above-described formula (II).

In the formula, R is each independently hydrogen, a hydroxyl group, a straight or branched alkyl group or alkoxyl group with a carbon number of 1 to 20 which may have a substituent, or any of the above-described structures. The e is (if present) an integer of 0 to 2 for each independent R, and x is (if present) an integer of 1 to 20.

The degree of sulfonation of the SPOSS is preferably higher from a viewpoint of giving a high concentration of sulfonic acid groups (proton conductivity) to the SPPSU. When the stability to water (mechanical strength) is taken into consideration, the total number of sulfonic acid groups can be a rational number greater than 2 on average per molecule, more preferably greater than 3 on average, even more preferably greater than 4 on average, while the maximum is 16. In a typical embodiment, the total number of sulfonic acid groups is about 8 or 16 on average per molecule. Most typically, the total number of sulfonic acid groups is about 8 on average per molecule.

From the similar viewpoint, typically, e is (if present) 1 or 2 for each independent R, and the total of e is about 8 or 16 on average per molecule. Most typically, the total of e is about 8 on average per molecule. When e is 1, the site of substitution of sulfonic acid group is usually para position, and when e is 2, the site of substitution of sulfonic acid group is usually two meta positions.

The method for synthesizing the sulfonated polyhedral oligomeric silsesquioxane (SPOSS) is not particularly limited, for example, may use any known method such as that disclosed in Hartmann-Thompson, C., J. Appl. Polym. Sci. 2008, 110, 958-974.

In the cross-linked composite, the mass proportion of the sulfonated polyhedral oligomeric silsesquioxane (SPOSS) to the sulfonated polyphenyl sulfone (SPPSU) is not particularly limited, but is usually 1% by mass or more and 15% by mass or less. The mass proportion is, from a viewpoint of maintaining good balance between high concentration of sulfonic acid groups and stability to water (more specifically, balance between proton conductivity and mechanical strength), preferably 1.5% by mass or more and 12% by mass or less, more preferably 2% by mass or more and 10% by mass or less, or 2% by mass or more and 8% by mass or less, or 2% by mass or more and 5% by mass or less.

The step of forming a cross-linked composite by cross-linking of the sulfonated polyphenyl sulfone (SPPSU) and the sulfonated polyhedral oligomeric silsesquioxane (SPOSS) via sulfonic acid groups is preferably carried out under heating. The reaction under heating sufficiently cross-links plural molecular chains of the SPPSU with the SPOSS, thereby increasing the high concentration of sulfonic acid groups (proton conductivity) while improving the stability to water (mechanical strength).

The method for producing a cross-linked composite of the sulfonated polyphenyl sulfone (SPPSU) and the sulfonated polyhedral oligomeric silsesquioxane (SPOSS) via sulfonic acid groups is not particularly limited, but usually may be carried out as follows.

The SPPSU is dissolved in an appropriate organic solvent. The organic solvent is not particularly limited, and may be, for example, an organic solvent with a high boiling point such as dimethyl sulfoxide (DMSO), dimethyl acetamide (DMAc), dimethyl formamide (DMF), or N-methyl-2-pyrrolidone (NMP). In an alternative embodiment, the organic solvent may be replaced or combined with any type of alcohol, e.g., at least one selected from the group consisting of isopropanol and 1-propanol, and/or water. The SPOSS is charged into a solution of the SPPSU at a mass proportion within the above-described range (usually 1% by mass or more and 15% by mass or less), and stirred at appropriate temperature of, for example, about 40° C. to 80° C., thereby preparing a dispersion. Subsequently, the solvent is evaporated from the dispersion at a moderately elevated temperature, thereby obtaining a cast membrane (unstretched membrane).

Subsequently, the SPPSU-SPOSS composite membrane as a cast membrane is heat-treated at a further elevated temperature, thereby obtaining a cross-linked composite. The heating temperature and time are not particularly limited, and, for example, selected form appropriate conditions from the ranges of about 90° C. to 210° C., and 1 hour to 3 days. It is also preferred that the membrane be heated at gradually elevated multiple temperatures. For example, the membrane may be continuously heated in the first stage at 100 to 140° C., the second stage at 140° C. to 180° C., and the third stage of 160° C. to 200° C. for 6 hours to 36 hours, respectively.

Optionally, following the heating step, it is also preferred that the cross-linked composite thus obtained be further heat-treated in sulfuric acid. At this time, the composite may be treated in, for example, 0.5 M to 5 M sulfuric acid at a temperature of about 50° C. to 100° C., for about 1 hour to 2 days. After the heat treatment, the composite is washed with water, thereby finally obtaining a SPPSU-SPOSS cross-linked membrane.

The proton exchange membrane fuel cell of the present invention includes an anode, a cathode, and a proton exchange membrane between the two electrodes composing the anode and cathode in contact with them, the proton exchange membrane including the above-described hydrocarbon-based cross-linked membrane.

This proton exchange membrane fuel cell is not particularly limited except that the proton exchange membrane includes the above-described hydrocarbon-based cross-linked membrane, and the anode and cathode may have any known structure.

All the values and the range of the values described in the present description and claims may include error ranges which are acceptable in the art, and it is intended that all of them may be modified with "about".

EXAMPLES

The present invention is further described in detail with reference to examples, but these examples are only illustrative, and will not limit the present invention.

Firstly, the methods for measuring various properties referred in Examples and Comparative Examples are described.

Ion Exchange Capacity (IEC)

A titration was carried out using a NaOH solution at a predetermined concentration, and the ion exchange capacity (IEC) was determined from the amount of NaOH solution when neutralized until the pH became 7 ([A] ml) and the concentration of the NaOH solution ([B] g/ml) using the following calculation formula.

Ion exchange capacity (IEC) (meq/g)=$[A] \times [B]$/sample weight (g)

Water Uptake (WU)

The water uptake of a sample was determined from the weights before and after hydration. Before the measurement, the membrane was cut into a piece of 10 mm×10 mm, and dried in a drying oven at a temperature of 100° C. for 24 hours. The weight of the dried membrane $W_{dry}$ was measured. Subsequently, the membrane was immersed in deionized water at 100° C. for 2 hours, and then surface water adhered to the membrane was removed. Thereafter, the weight of the wet membrane $W_{wet}$ was measured. Using these values, the water uptake (WU) (sometimes referred to as water absorption rate) was calculated using the following formula.

WU (%)=$[(W_{wet}-W_{dry})/W_{dry}] \times 100$

Swelling Ratio

The dry membrane and the wet membrane were obtained by the same manner as in the measurement of water uptake (WU). The swelling ratio was calculated by the following formula using the thickness of the dry membrane $S_{dry}$ and the thickness of the wet membrane $S_{wet}$.

Swelling ratio (%)=$[(S_{wet}-S_{dry})/S_{dry}] \times 100\%$

[λ (Number of Water Molecules Per Sulfonic Acid): $n(H_2O)/n(SO_3H)$]

The dry membrane and the wet membrane were obtained by the same manner as in the measurement of water uptake (WU). λ (number of water molecules per sulfonic acid) was calculated by the following formula using the weight of the dry membrane $W_{dry}$ and the weight of the wet membrane $W_{wet}$.

λ=$[(W_{wet}-W_{dry}) \times 1000]/[18 \times$(molecular weight of $H_2O) \times IEC \times W_{dry}]$=(water uptake (%)×10)/[molecular weight of $H_2 \times IEC$]

Synthesis Example of SPPSU

Figure 1:
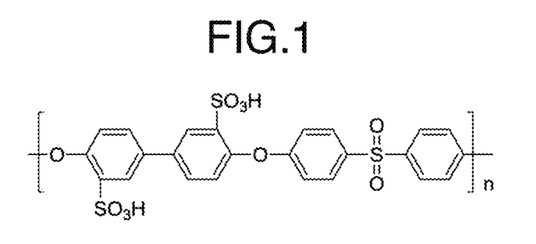
FIG. 1 is a schematic view of the chemical structure of an SPPSU having a degree of sulfonation of 2 obtained in Synthesis Example of SPPSU ("n" in the figure means the number of repeating units in the SPPSU actually obtained).

The powder of a PPSU ("Radel R-5000", Solvay) was dissolved in sulfuric acid at a ratio of 1 g: 20 ml, and sulfonated for two days at 50° C. under stirring in the presence of nitrogen gas. This solution was cooled with ice, poured into significantly excessive water under stirring, thereby obtaining a white precipitate. After standing overnight, the precipitate was filtered, and washed using a dialysis tubing cellulose membrane until the pH became 7. This object was dried to obtain a sulfonated polyphenyl sulfone (SPPSU). As described later, the ion exchange capacity (IEC) of the SPPSU thus obtained was equivalent to the calculated value (3.6 meq/g), indicating that about two sulfonic acid groups had been introduced per repeating unit. The schematic view of the chemical structure of the SPPSU is depicted in FIG. 1.

Synthesis Example of SPOSS

Figure 2:
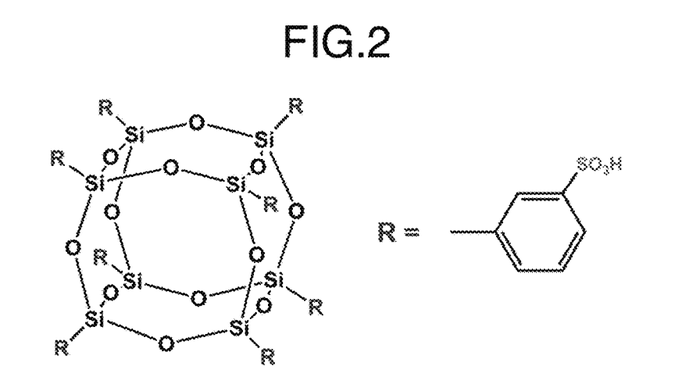
FIG. 2 is a schematic view of the chemical structure of an SPOSS obtained in Synthesis Example of SPOSS.

An octaphenyl-POSS and chlorosulfonic acid were mixed at a ratio of 1 g:10 ml, and then subjected to a sulfonation reaction at 50° C. for 3 days. Subsequently, unreacted chlorosulfonic acid was removed by vacuum distillation, and washed with water. Subsequently, the object was filtered, and water was removed by vacuum distillation, thereby obtaining a sulfonated polyhedral oligomeric silsesquioxane (SPOSS). Identification of the SPOSS was carried out using FT-IR as described in Non-Patent Literature 7. As a result of this, it was found that, as schematically depicted in FIG. 2, the SPOSS has a structure wherein a sulfonated phenyl group (more specifically, a substituent wherein one sulfonic acid group is bonded to each unit of phenyl group) is bonded to each Si atom.

Example 1

Synthesis of SPPSU-SPOSS Composite Membrane

The SPPSU polymer thus obtained was dissolved in DMSO (dimethyl sulfoxide) at a ratio of 1 g:19 g. The SPOSS was charged into the SPPSU solution at a ratio of 2% by mass relative to the SPPSU, and dispersed under stirring at 60° C. for 1 hour. The SPPSU-SPOSS dispersion was placed in a petri dish, the solvent was evaporated at 80° C. over one day, thus obtaining an SPPSU-SPOSS composite membrane as a cast membrane (i.e. a non-oriented membrane).

Making of SPPSU-SPOSS Cross-Linked Membrane

Figure 3:
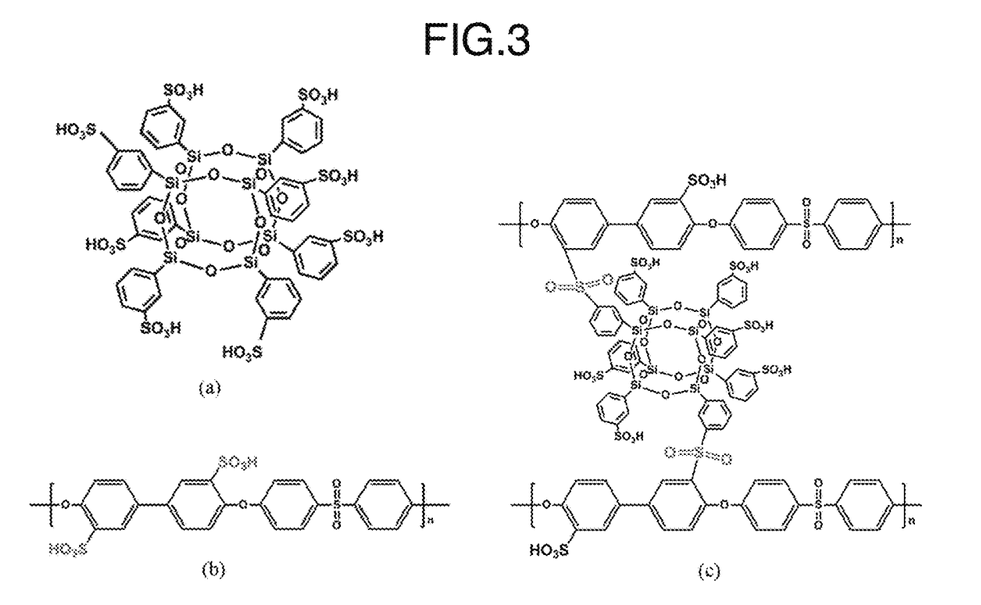
FIG. 3 is a schematic view of the chemical structure of an SPPSU-SPOSS cross-linked composite membrane obtained in Example 1 (the same applies to Examples 2 and 3). In the figure, (a) represents an SPOSS (sulfonated phenyl groups are bonded to each Si atom), (b) represents an SPPSU (degree of sulfonation: 2), and (c) represents the schematic structure of the SPPSU-SPOSS cross-linked composite membrane finally obtained.

The SPPSU-SPOSS composite membrane obtained as described above was heated at 120° C. for one day, at 160° C. for one day and then at 180° C. for one day, thereby obtaining an SPPSU-SPOSS cross-linked membrane. The SPPSU-SPOSS cross-linked membrane was treated in 1 M sulfuric acid at 80° C. for 15 hours, and then water-washed, thereby completing a SPPSU-SPOSS cross-linked composite membrane. The chemical structure of the SPPSU-SPOSS cross-linked composite membrane finally obtained is schematically given in FIG. 3. In the figure, (a) represents the schematic structure of the SPOSS (in which sulfonated phenyl groups are bonded to each Si atom), (b) represents the SPPSU (with a degree of sulfonation of 2), and (c) represents the SPPSU-SPOSS cross-linked composite membrane finally obtained.

Example 2

A SPPSU-SPOSS cross-linked composite membrane was made in the same manner as in Example 1, except that the proportion of the SPOSS to the SPPSU was changed to 5% by mass.

Example 3

A SPPSU-SPOSS cross-linked composite membrane was made in the same manner as in Example 1, except that the proportion of the SPOSS to the SPPSU was changed to 10% by mass.

Comparative Example 1

The SPPSU polymer obtained as described above was dissolved in DMSO (dimethyl sulfoxide) at a ratio of 1 g:19 g. The SPPSU solution was placed in a petri dish, the solvent was evaporated at 80° C. over one day, thereby obtaining a SPPSU cast membrane (i.e. a non-oriented film). The SPPSU cast membrane was heated at 120° C. for one day, 160° C. for one day and then at 180° C. for one day, thereby obtaining a SPPSU cross-linked membrane (free from SPOSS).

Characteristic Evaluation, Discussion

Physicochemical properties of the SPPSU polymer obtained in the above-described Synthesis Example, the SPPSU cross-linked membrane obtained in Comparative Example 1, and the SPPSU-SPOSS cross-linked membranes obtained in Examples 1 to 3 (SPOSS 2% by mass, SPOSS 5% by mass, and SPOSS 10% by mass) at room temperature are given in Table 1.

(Comparative Example 1) of 316% to 103%, and suppressed swellability in the length direction. Additionally, with respect to the SPPSU-SPOSS cross-linked composite membrane (SPOSS 5% by mass) of Example 2 and the SPPSU-SPOSS cross-linked composite membrane (SPOSS 10% by mass) of Example 3, the swellability was made smaller by further increasing the amount of the SPOSS.

As far as the SPPSU-SPOSS cross-linked composite membrane (SPOSS 2% by mass) of Example 1 is concerned, the swellability in the thickness direction was higher than others. For the SPPSU-SPOSS cross-linked composite membranes of Examples 1 to 3, the number of water molecules per sulfonic acid group noticeably decreased in comparison with the SPPSU cross-linked membrane free from SPOSS of Comparative Example 1.

Figure 4:
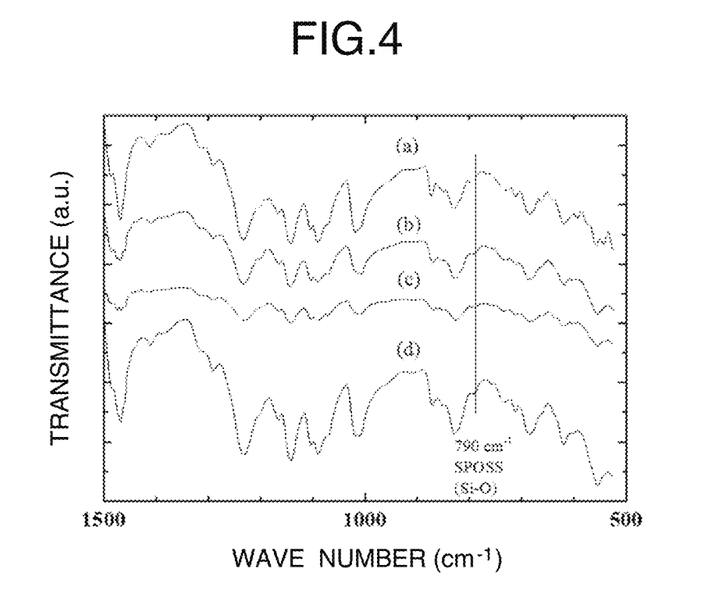
FIG. 4 depicts the properties of the chemical structure of an SPPSU cross-linked membrane obtained in Comparative Example 1 and the SPPSU-SPOSS cross-linked composite membranes obtained in Examples 1 to 3 (SPOSS 2% by mass, SPOSS 5% by mass, and SPOSS 10% by mass) as measured by FT-IR.

The SPPSU cross-linked membrane obtained in Comparative Example 1, and the SPPSU-SPOSS cross-linked composite membranes obtained in Examples 1 to 3 (SPOSS 2% by mass, SPOSS 5% by mass, and SPOSS 10% by mass) were measured by FT-IR, and the properties of their chemical structures are depicted in FIG. 4. In the figure, (a) represents the SPPSU cross-linked membrane of Comparative Example 1, (b) represents the SPPSU-SPOSS cross-linked composite membrane containing 2% by mass of the SPOSS of Example 1, (c) represents the SPPSU-SPOSS cross-linked composite membrane containing 5% by mass of the SPOSS of Example 2, and (d) represents the SPPSU-SPOSS cross-linked composite membrane containing 10% by mass of the SPOSS of Example 3, respectively.

In FIG. 4, for the SPPSU-SPOSS cross-linked composite membranes of (b) to (d), the peaks derived from sulfonic acid are hard to be discriminated because the SPPSU and the SPOSS are overlapped with each other, but the Si—O peak

TABLE 1

Room temperature properties of SPPSU polymer of Synthesis Example, SPPSU cross-linked membrane of Comparative Example 1, SPPSU-SPOSS cross-linked composite membranes of Examples 1 to 3

| | IEC(meq/g) | Water uptake | Swelling ratio | $\lambda$ $[n(H_2O)/n(SO_3H)]$ *1 | Organic solvent |
|---|---|---|---|---|---|
| SPPSU synthetic polymer | 3.6 | dissolved | dissolved | — | dissolved |
| SPPSU cross-linked membrane | 2.516 | 316% | 12% | 70 | insoluble |
| SPPSU-2% SPOSS cross-linked composite membrane | 2.297 | 103% | 52% | 25 | insoluble |
| SPPSU-5% SPOSS cross-linked composite membrane | 1.547 | 21% | 6% | 7.6 | insoluble |
| SPPSU-10% SPOSS cross-linked composite membrane | 1.7 | 10% | 3% | 3.3 | insoluble |

*1 Number of water molecules per sulfonic acid group

The ion exchange capacity (IEC) of the SPPSU polymer obtained in Synthesis Example was very high, and equivalent to the calculated value (3.6 meq/g). This means that about two sulfonic acid groups are introduced per repeating unit. Accordingly, this SPPSU polymer is readily soluble in water and organic solvents. However, as in Examples 1 to 3 and Comparative Example 1, the polymer is cross-linked by making a cast membrane and subjecting to a heating process at a temperature of up to 180° C., and becomes insoluble in water and organic solvents.

The SPPSU cross-linked membrane free from SPOSS of Comparative Example 1 is insoluble in water and organic solvents, but when the membrane is present in water, it swelled with a large amount of water, and the swellability is high particularly in the length direction.

On the other hand, for the SPPSU-SPOSS cross-linked membrane (SPOSS 2% by mass) obtained in Example 1, the cross-linking with the SPOSS decreased the swellability in water of the cross-linked membrane of the SPPSU alone derived from the SPOSS is observed at 790 cm-1, so that the introduction of the SPOSS was confirmed. On the other hand, the cross-linking between the sulfonic acid group of the SPOSS and the sulfonic acid group of the SPPSU by the heat treatment overlaps with the S=O peak derived from the SPPSU bond, so their discrimination is difficult. However, the water uptake of the cross-linked membrane markedly decreased (see Table 1), which indirectly indicates the achievement of cross-linking.

Figure 5:
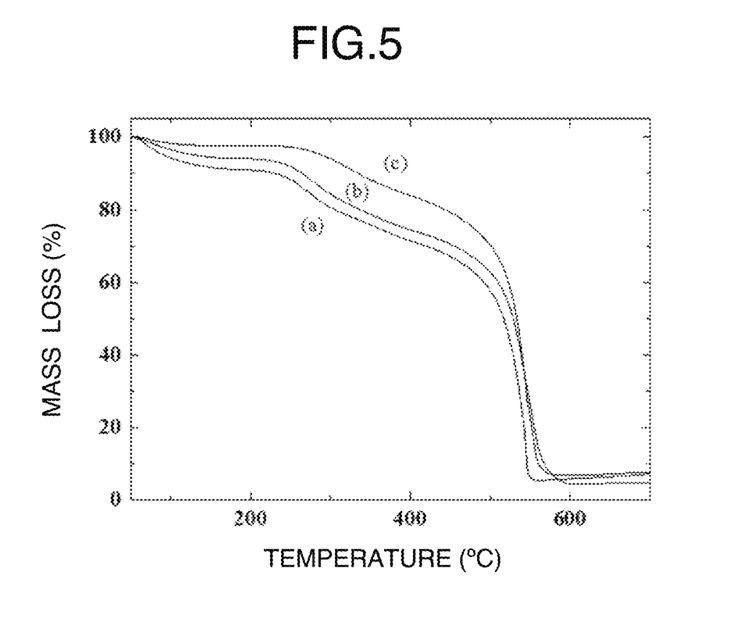
FIG. 5 depicts the thermal characteristics of the SPPSU cross-linked membrane obtained in Comparative Example 1 and the SPPSU-SPOSS cross-linked composite membranes obtained in Examples 1 and 2 (SPOSS 2% by mass and SPOSS 5% by mass) as measured by TGDTA in an oxygen atmosphere.

The thermal properties of the SPPSU cross-linked membrane obtained in Comparative Example 1 and the SPPSU-SPOSS cross-linked composite membranes (SPOSS 2% by mass, SPOSS 5% by mass) obtained in Examples 1 to 2 were measured by TGDTA in an oxygen atmosphere, and the results are given in FIG. 5. In the figure, (a) represents the SPPSU cross-linked membrane of Comparative Example 1, (b) represents the SPPSU-SPOSS cross-linked composite membrane containing 2% by mass of the SPOSS of Example 1, and (c) represents the SPPSU-SPOSS cross-linked composite membrane containing 5% by mass of the SPOSS of Example 2, respectively.

FIG. 5 indicates that the cross-linking of the SPPSU with the SPOSS in Examples 1 and 2 makes the thermal stability of the cross-linked composite membrane higher than that of the SPPSU cross-linked membrane (SPPSU alone) in Comparative Example 1, and that the thermal stability increased with higher loading of the SPOSS. The reason for this is due to the increase of the cross-linking with the SPPSU accompanied with higher loading of the SPOSS.

Figure 6:
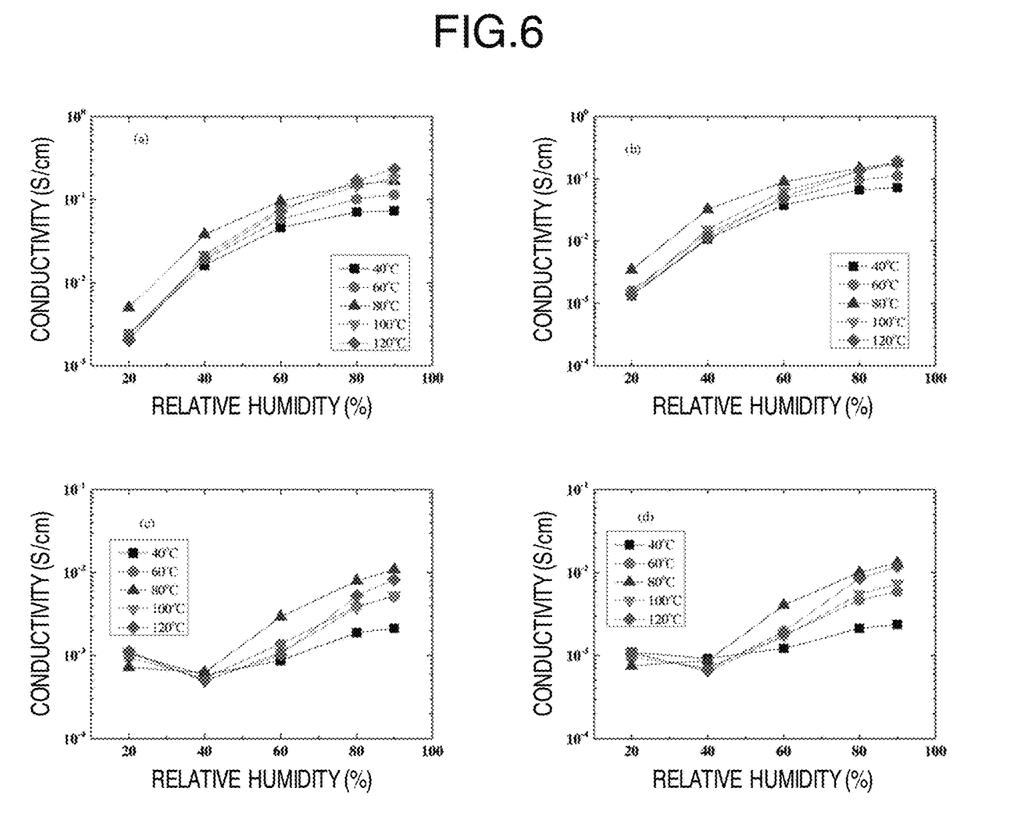
FIG. 6 depicts the conductive properties of the SPPSU cross-linked membrane obtained in Comparative Example 1 (thickness: 0.162 mm) and the SPPSU-SPOSS cross-linked composite membranes obtained in Examples 1 to 3 (SPOSS 2% by mass (thickness: 0.117 mm), SPOSS 5% by mass (thickness: 0.06 mm), and SPOSS 10% by mass (thickness: 0.067 mm) as evaluated in terms of temperature and RH %. In the figure, (a) represents the SPPSU cross-linked membrane of Comparative Example 1, (b) represents the SPPSU-SPOSS cross-linked composite membrane containing 2% by mass of SPOSS of Example 1, (c) represents the SPPSU-SPOSS cross-linked composite membrane containing 5% by mass of SPOSS of Example 2, and (d) represents the SPPSU-SPOSS cross-linked membrane containing 10% by mass of SPOSS of Example 3.

The SPPSU cross-linked membrane obtained in Comparative Example 1 (thickness: 0.162 mm), and the SPPSU-SPOSS cross-linked composite membranes obtained in Examples 1 to 3 (SPOSS 2% by mass (thickness: 0.117 mm), SPOSS 5% by mass (thickness: 0.06 mm), and SPOSS 10% by mass (thickness: 0.067 mm)) were evaluated for the conductivity properties in terms of temperature and RH %, and the results are given in FIG. 6. In the figure, (a) represents the SPPSU cross-linked membrane of Comparative Example 1, (b) represents the SPPSU-SPOSS cross-linked composite membrane containing 2% by mass of the SPOSS of Example 1, (c) represents the SPPSU-SPOSS cross-linked composite membrane containing 5% by mass of the SPOSS of Example 2, and (d) represents the SPPSU-SPOSS cross-linked composite membrane containing 10% by mass of the SPOSS of Example 3, respectively.

The SPPSU cross-linked membrane obtained in Comparative Example 1 had high conductivity of about 0.2 S/cm at 80° C., 90% RH. However, as given in Table 1, the cross-linked membrane had a very high water uptake, and poor stability in water.

On the other hand, the SPPSU-SPOSS cross-linked composite membrane (SPOSS 2% by mass) of Example 1 had a lowered water uptake that was one third or less than the SPPSU cross-linked membrane (free from SPOSS) of Comparative Example 1, but nevertheless, it achieved an equivalent high conductivity at 80° C., 90% RH. The reason for this is likely that the SPPSU and the SPOSS were cross-linked in Example 1, whereby the SPOSS decreased the water uptake and increased stability of the cross-linked membrane without interference of proton conductivity. In Examples 2 and 3 wherein the SPOSS amount was increased (5% and 10%), the water uptake further decreased due to the enhancement of cross-linking, and the possibility of interference of proton conduction path increased, whereby the decrease of conductivity was observed.

What is claimed is:

1. A hydrocarbon-based cross-linked membrane used in a proton exchange membrane of a proton exchange membrane fuel cell, the hydrocarbon-based cross-linked membrane comprising:
    a cross-linked composite of a sulfonated polyphenyl sulfone (SPPSU) and a sulfonated polyhedral oligomeric silsesquioxane (SPOSS) via sulfonic acid groups.

2. The hydrocarbon-based cross-linked membrane according to claim 1, wherein the cross-linked composite is a cross-linked composite of:
    the SPPSU having a structure represented by the formula (I):

(wherein a, b, c, and d are each independently an integer of 0 to 4, the total of a, b, c, and d is a rational number greater than 1 on average per repeating unit), and
the SPOSS having a structure represented by the formula (II):

(wherein R is each independently hydrogen, a hydroxyl group, a straight or branched alkyl group or alkoxyl group with a carbon number of 1 to 20 which may have a substituent, or any of the above-described structures; e is (if present) an integer of 0 to 2 for each independent R; x is (if present) an integer of 1 to 20, and the total number of sulfonic acid groups is a rational number greater than 2 on average per molecule).

3. The hydrocarbon-based cross-linked membrane according to claim 2, wherein the total of a, b, c, and d is 2 or more on average per repeating unit, and/or the total of e is 8 or 16 on average per molecule.

4. The hydrocarbon-based cross-linked membrane according to claim 1, wherein the mass proportion of the SPOSS to the SPPSU in the cross-linked composite is 10% by mass or less.

5. A proton exchange membrane fuel cell comprising the hydrocarbon-based cross-linked membrane according to claim 1 as a proton exchange membrane.

6. A method for producing a hydrocarbon-based cross-linked membrane used in a proton exchange membrane of a proton exchange membrane fuel cell, comprising
    a step of forming a cross-linked composite by subjecting a sulfonated polyphenyl sulfone (SPPSU) and a sulfonated polyhedral oligomeric silsesquioxane (SPOSS) to a cross-linking reaction via sulfonic acid groups under heating.

7. The method for producing a hydrocarbon-based cross-linked membrane according to claim 6, wherein the step of forming a cross-linked composite comprises:

subjecting the SPPSU represented by the formula (I):

(wherein a, b, c, and d are each independently an integer of 0 to 4, the total of a, b, c, and d is a rational number greater than 1 on average per repeating unit), and
the SPOSS represented by the formula (II):

(wherein R is each independently hydrogen, a hydroxyl group, a straight or branched alkyl group or alkoxyl group with a carbon number of 1 to 20 which may have a substituent, or any of the above-described structures, e is (if present) an integer of 0 to 2 for each independent R, x is (if present) an integer of 1 to 20, and the total number of sulfonic acid groups is a rational number greater than 2 on average per molecule) to a cross-linking reaction via sulfonic acid groups.

8. The method for producing a hydrocarbon-based cross-linked membrane according to claim 7, wherein the total of a, b, c, and d is 2 or more on average per repeating unit, and/or the total of e is 8 or 16 on average per molecule.

9. The method for producing a hydrocarbon-based cross-linked membrane according to claim 6, wherein the mass proportion of the SPOSS to the SPPSU in the cross-linked composite is 10% by mass or less.

10. The method for producing a hydrocarbon-based cross-linked membrane according to claim 6, wherein the step of forming a cross-linked composite is followed by a step of heat-treating the thus obtained cross-linked composite in sulfuric acid.

\* \* \* \* \*